No. 819,015. PATENTED APR. 24, 1906.
J. V. HULL.
SAFETY CLOSURE FOR BOTTLES, JARS, AND OTHER RECEPTACLES.
APPLICATION FILED JULY 14, 1905.
Fig. 1.
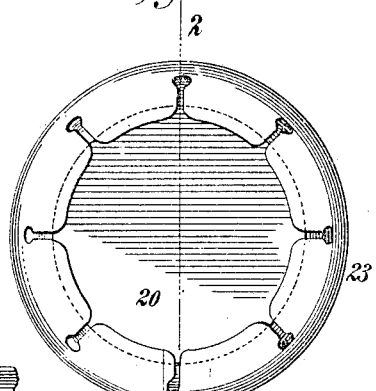
Fig. 7.
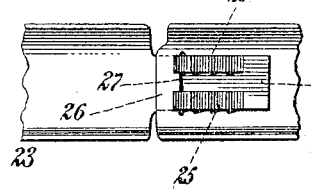
Fig. 8.
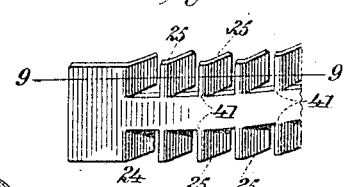
Fig. 2.
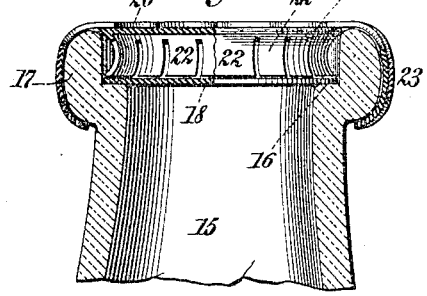
Fig. 9.
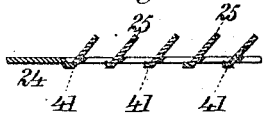
Fig. 10.
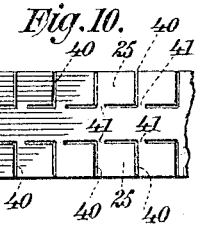
Fig. 3.
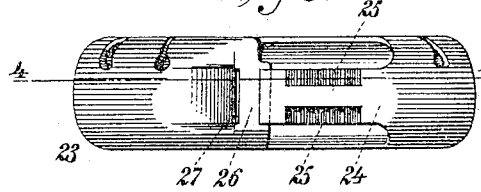
Fig. 5.
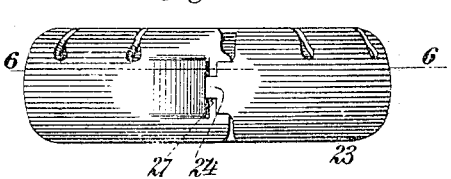
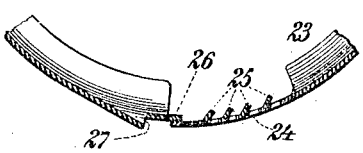
Fig. 4.
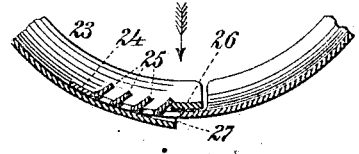
Fig. 6.
WITNESSES:
Gustave H. Dietrich
Edwin H. Dietrich
INVENTOR
Joseph V. Hull
BY
Chas. E. Gill
ATTORNEY

UNITED STATES PATENT OFFICE.

JOSEPH V. HULL, OF BROOKLYN, NEW YORK, ASSIGNOR TO HARRY C. BLYE, OF NEW YORK, N. Y.

SAFETY-CLOSURE FOR BOTTLES, JARS, AND OTHER RECEPTACLES.

No. 819,015.  Specification of Letters Patent.  Patented April 24, 1906.

Application filed July 14, 1905. Serial No. 269,596.

*To all whom it may concern:*

Be it known that I, JOSEPH V. HULL, a citizen of the United States, and a resident of Brooklyn, in the county of Kings and State of New York, have invented certain new and useful Improvements in Safety-Closures for Bottles, Jars, and other Receptacles, of which the following is a specification.

The invention relates to improvements in closures for bottles and jars; and it consists in the novel features of construction and combinations of parts hereinafter described, and particularly pointed out in the claims.

The object of the invention is to produce satisfactory means for closing the mouth of a jar or bottle and which means upon the opening or unsealing of the jar or bottle becomes destroyed or rendered incapable of further use.

I present my invention in this application as applied to an ordinary milk-bottle, and my purpose is to so close the mouth of the bottle that fraud may not be practiced with respect to the contents of said bottle.

It is probably well understood that the county medical society in some locations certifies to the character of certain milk supplied in bottles and that the milk so supplied is known as "certified" milk, the bottles containing it bearing a label or other insignia indicating that the contents of the bottles is certified milk. It has been found that some persons pour from the bottles the certified milk and refill the same with a cheaper grade of milk which is not certified milk, and it is to prevent these practices and to assure to the consumer that the milk received by him is certified milk that the present invention has been produced.

In accordance with my invention the mouth of the bottle may be sealed in accordance with known or suitable methods, such as by means of the customary paper disk extensively used for sealing milk-bottles, and when my invention is applied to the mouth of the bottle or jar the latter cannot be opened without destroying the safety locking means produced by me, the presence of these means in their proper condition on the mouth of a bottle being an assurance to the consumer that the bottle contains its original contents.

The present invention embraces certain improvements on the safety-closure made the subject of Letters Patent No. 734,177, granted July 21, 1903, to Joseph V. Hull, and the said invention will be fully understood from the description hereinafter presented, reference being had to the accompanying drawings, in which—

Figure 1 is a top view of the upper end of a milk-bottle equipped with a closure embodying my invention. Fig. 2 is a vertical section of same on the dotted line 2 2 of Fig. 1. Fig. 3 is an enlarged detached side elevation of the safety locking-band forming a part of the closure, the ends of the band being shown as free from each other, but in position to be pushed together and engaged with each other. Fig. 4 is a horizontal section of a portion of same on the dotted line 4 4 of Fig. 3. Fig. 5 is a side elevation corresponding with Fig. 3, but showing the ends of the band as having been pushed together into locking relation. Fig. 6 is a horizontal section of a portion of same on the dotted line 6 6 of Fig. 5. Fig. 7 is an inner face view of a portion of the band looking in the direction of the arrow in Fig. 6. Fig. 8 is an enlarged detached perspective view of the tongue forming a part of the locking-band. Fig. 9 is a horizontal section of same on the dotted line 9 9 of Fig. 8; and Fig. 10 is a detached view, partly broken away, of a portion of the blank from which the locking-band is formed, the portion shown being that utilized in making up the locking-tongue of said band.

In the drawings, 15 designates the upper portion of an ordinary form of milk-bottle, this bottle having within its mouth an annular shoulder 16 and around the exterior of its upper end an annular shoulder 17, the shoulder 16 being provided to receive a sealing medium or stopper, the customary form of sealing medium being a paper disk 18, which fits closely within the mouth of the bottle and bears upon the said shoulder 16. Within the mouth of the bottle and to bear upon the paper disk 18 I preferably place a tin cap or filler 19, having a flat top 20 and downwardly-extending sides, the latter preferably being concaved and slitted, as shown in Fig. 2, to form a series of fingers 22. The flat top of the cap 19 is about on a level with the upper edges of the bottle-neck, and the lower edges of the fingers 22 of said cap bear upon the disk 18 and serve to hold the edges of the same upon the shoulder 16. The cap 19 is not separately claimed herein and is shown in my aforesaid Letters Patent No. 734,177.

The presence of the cap 19 alone would not effectually seal the bottle and would afford no greater security than would the disk 18 without said cap 19, and consequently I provide the locking-band 23, which embodies the novel features of my present invention and which fits upon the exterior shoulder 17 of the bottle, so as to be incapable of vertical movement and laps over at its upper edge upon the outer edges of the top of the cap 19, the said band 23 when fastened in position serving to lock the cap 19 and disk 18 within the mouth of the bottle. The locking-band 23 is formed of sheet metal and at its meeting ends is provided with means whereby the band may be locked in position upon the shoulder 17, and my present invention pertains more particularly to such means for locking said band in position. One end of the band 23 is formed with a tongue 24, having along its opposite edges the series of locking-lips 25, and the other end of said band is formed with the depressed loop 26 and slit 27. The tongue 24 is formed with a series of the locking-lips 25, so that the band may be tightly drawn around the shoulder 17 of the bottle, notwithstanding the usual irregularities in the diameter of bottles across the shoulders 17 thereon. The tongue 24 is formed from a blank having the triangular slits 40 formed therein along its opposite sides, as shown in Fig. 10, these triangular slits defining edges of the lips 25 and permitting said lips to be bent inwardly from the main body of the tongue to the position shown in Figs. 8 and 9, the lips 25 then constituting a series of inwardly-inclined teeth or edge projections held to the main body of the tongue by the narrow weakened portions 41. When the band is to be applied upon the bottle, it will be drawn closely over the shoulder 17 thereon, and the outer plain end of the tongue 24 will be passed over the depressed loop 26 and through the slit 27, the movement of the tongue 24 through said slit being continued until the band 23 has closely engaged the shoulder 17 and one pair of the locking-lips 25 has passed beyond the inner edge of said loop, so as to engage said edge, as shown in Fig. 6, at which time it will be found that the locking-band is securely fastened upon the bottle and will effectually hold the cap 19 and disk 18 in position. The consumer will remove the band 23, cap 19, and disk 18 when it is desired to use the contents of the bottle, and the removal of the band 23 will be accomplished by inserting the tine of a fork or other instrument behind the tongue 24 intermediate the facing ends of said band 23 and prying against the said tongue until the lips 25 become broken or distorted, so that said tongue may be removed from the slit 27 or the tongue itself becomes broken, thus freeing the ends of the band 23 and leaving the latter in condition to be readily removed. Upon the removal of the band 23 the cap 19 and disk 18 may be readily withdrawn from the mouth of the bottle. The removal of the band 23 is only accomplished by its destruction, since when the locking-lips 25 have become torn off or distorted or the tongue itself has become broken the band cannot be restored to its original condition on the bottle, and hence when the consumer receives a bottle of milk with the band 23 thereon in proper condition it will be an assurance that the original contents are within the bottle. The locking-band 23 is thus a benefit to the consumer, and it renders effective the certification of the milk.

I do not limit my invention to the paper disk 18 and cap 19, since my invention pertains more particularly to the locking-band 23, and especially to the construction of the means presented for locking the two ends of the band together on the bottle. The construction of tongue 24 shown has been found to be convenient and economical of construction and efficient in use, the lips 25 being at both edges of the tongue and adapted to securely engage the edge of the loop 26. The transverse portions of the slits 40 weaken the tongue itself and define the transverse edges of the lips 25, and the longitudinal portions of the slits 40 almost connect said transverse portions of said slits, leaving the lips 25 held to the tongue by the narrow necks 41, which during the prying off of the band permit said lips to be so torn or distorted that the band may be freed and also rendered incapable of further use.

If bottles were of uniform diameter across the exterior shoulder 17, the tongue 24 would require but one pair of the lips 25; but since usual bottles are irregular in such diameter I provide the tongue 24 with a series of pairs of lips 25, so that the locking-bands may be adapted to the varying conditions of the bottles.

What I claim as my invention, and desire to secure by Letters Patent, is—

1. A bottle and means for closing the mouth of same, combined with a locking-band fixedly encompassing the exterior surface of said bottle about said mouth and engaging said closing means, said band having at one end a tongue and at the other end a slit to receive said tongue, and said tongue having at its opposite edges locking-lips cut therefrom and held to the tongue by weak parts and adapted to engage the edge of said slit; substantially as set forth.

2. A bottle and means for closing the mouth of same, combined with a locking-band fixedly encompassing the exterior surface of said bottle about said mouth and engaging said closing means, said band having at one end a tongue and at the other end a slit to receive said tongue, and said tongue having at its opposite edges a series of locking-lips cut therefrom and held to the tongue by weak parts and adapted to engage the edge of said slit; substantially as set forth.

3. A bottle and means for closing the mouth of same, combined with a locking-band fixedly encompassing the exterior surface of said bottle about said mouth and engaging said closing means, said band having at one end a tongue and at the other end a slit to receive said tongue, and said tongue having at its opposite edges locking-lips to engage the edge of said slit, said lips being formed by slitting the tongue transversely and longitudinally at opposite sides and bending the lips from the tongue, and said lips being held to the tongue by weak parts left at adjacent portions of said slits; substantially as set forth.

4. A bottle and means for closing the mouth of same, combined with a locking-band fixedly encompassing the exterior surface of said bottle about said mouth and engaging said closing means, said band having at one end a tongue and at the other end a slit to receive said tongue, and said tongue having at its opposite edges a series of locking-lips to engage the edge of said slit, said lips being formed by cutting triangular slits in opposite sides of said tongue and bending the lips therefrom, and said lips being held to the tongue by weak parts left at adjacent portions of said slits; substantially as set forth.

Signed at New York city, in the county of New York and State of New York, this 13th day of July, A. D. 1905.

JOSEPH V. HULL.

Witnesses:
 CHAS. C. GILL,
 ARTHUR MARION.